United States Patent
Yevick

[11] 4,217,041
[45] Aug. 12, 1980

[54] CASSEGRAINIAN MICROFICHE LENS CONSTRUCTION

[75] Inventor: George J. Yevick, Leonia, N.J.

[73] Assignee: IZON Corporation, New York, N.Y.

[21] Appl. No.: 717,808

[22] Filed: Sep. 13, 1976

[51] Int. Cl.$^2$ .............................................. G03B 23/08
[52] U.S. Cl. .................. 353/120; 353/27 R; 350/201
[58] Field of Search .................. 353/120, 27 AR, 50, 353/51, 77, 99, 98; 350/201

[56] References Cited

U.S. PATENT DOCUMENTS

| | | | |
|---|---|---|---|
| 2,640,393 | 6/1953 | Wreathall | 350/201 |
| 3,064,526 | 11/1962 | Lindsay | 350/201 |
| 3,397,362 | 8/1968 | Grayson et al. | 350/201 |
| 3,704,068 | 11/1972 | Waly | 353/27 R |
| 3,864,034 | 2/1975 | Yevick | 353/120 |

Primary Examiner—John W. Shepperd
Attorney, Agent, or Firm—Daniel M. Rosen

[57] ABSTRACT

A microfiche construction embodying Cassegrainian reflecting surfaces. A fixed projection sheet is provided with convex lenses on its top surface, the lower peripheries of which are internally mirrored. An indexable lensfiche is provided with sunken convex reflecting mirrors on its top surface which are optically aligned with corresponding upper lens of the projection sheet to define Cassegrainian surfaces. Light modulated by microimages on the lensfiche strikes the Cassegrainian surfaces and passes to a viewing screen. In an embodiment, the projection sheet carries both Cassegrainian reflectors.

2 Claims, 3 Drawing Figures

CASSEGRAINIAN MICROFICHE LENS CONSTRUCTION

This invention relates to a microfiche recording and readout device, such devices exhibiting utility in the field of the optical storage of information. As shown in my U.S. Pat. Nos. 3,864,034; 3,903,531; 3,907,420; and 3,944,350 (all incorporated by reference) information storage and retrieval is facilitated by a construction employing a great number of very small lenses, each of which receives or projects a cone of light of narrow angle. A plurality of microimages distributed over a photographic emulsion is projected onto a viewing screen or the like. Each microimage is projected, at relatively small angles through one or more projection lenses for display. The greater the magnification of the projected microimages before they reach a viewing screen, the greater will be the information storage and retrieval capacity of the microfiche.

According to the practice of this invention, a Cassegrainian type of optics is employed which yields large magnification and accordingly enhances the information storage and retrieval capability of a microfiche device embodying the principles illustrated in the above noted patents. A lens projection plate carries a plurality of convex projection lenses each of which is provided with an annular reflecting coating adjacent its outermost periphery. This defines the upper reflecting surface of a Cassegrainian type reflector. The lower Cassegrainian reflector is defined by a convex reflecting surface which is carried either by the top of a lensfiche (in the case wherein a photographic emulsion is carried by a plate which has integral lenslets thereon) or by the bottom surface of the projection lens plate itself, in the case where the emulsion is not affixed to a carrier which has integral lenslets.

IN THE DRAWINGS

Figure 1:
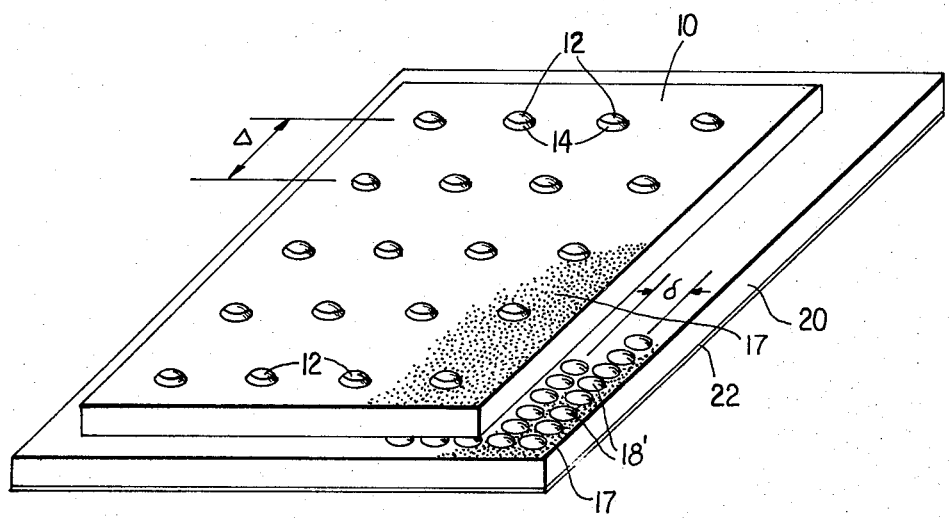
FIG. 1 is a perspective view of a typical combination of a microfiche viewer/recorder and illustrates a projection lens plate and a lensfiche.

Referring now to the drawings, the numeral 10 denotes generally a transparent projection lens plate formed of poly methymythacrylate for example, or other suitable transparent substance, the plate carrying integral convex lenses 12 on the top surface thereof. Each lens is provided around its lower periphery with a reflecting surface 14, this surface reflecting light interiorly of the lens 12. The numeral 20 denotes a relatively rigid base, also formed of a transparent material such as poly methylmythacrylate whose lower surface is provided with a photographic emulsion 22. The base and emulsion define a microfiche.

Figure 2:
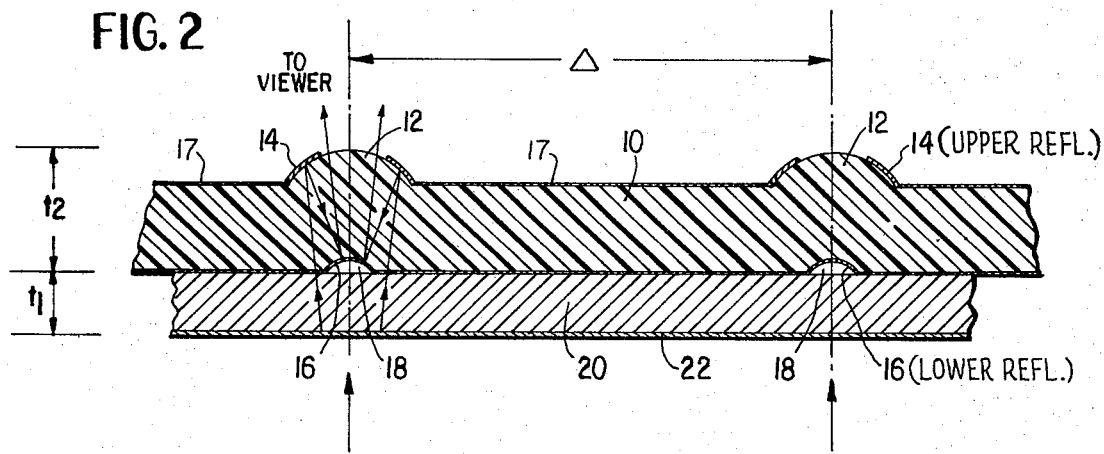
FIG. 2 is a partial cross-sectional view of a device such as shown at FIG. 1 according to one embodiment.

Referring now to FIG. 2 of the drawings, the numeral 16 denotes any one of a plurality of recesses in lens plate 10, the recesses 16 optically aligned with a corresponding projection lens 12. The numeral 18 denotes a lower mirrored reflecting surface on the surface of each recess 16.

As indicated at the left portion of FIG. 2, the mode of operation of the assembly is such that in the case where readout takes place, light from suitable sources (not illustrated) illuminates the microimages carried by emulsion 22. These microimages are projected upwardly and strike mirrored surfaces 14. They then reflect down to mirrored surfaces 18 for subsequent reflection through the center of lenses 12 in a direction generally normal to the plane of projection lens plate 10. The reader will understand that in the recording phase just the opposite takes place. Namely, information in the form of modulated light (from a scene to be photographed) passes downwardly through the centers of lens 12 and is reflected in the opposite direction for recordation on emulsion 22. In the case of readout, the reader will further understand that the phrase—photographic emulsion—is intended to cover not only a chemical photographic emulsion, but also any information which may be printed or otherwise affixed to the lower surface of base 20.

Figure 3:
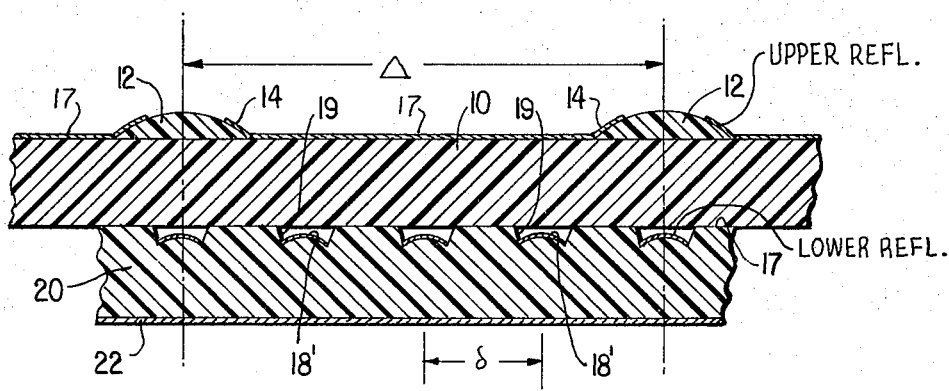
FIG. 3 is a view similar to FIG. 2 and illustrates another embodiment.

Referring now to FIG. 3 of the drawings, a modification is illustrated wherein the lower Cassegrainian reflecting surfaces are positioned within sunken recesses 19 of the upper surface of base 20 and are denoted by the numeral 18'. The reader will readily appreciate that the Cassegrainian action of the embodiment of FIG. 3 is identical to that illustrated with respect to the embodiment of FIG. 2.

What is claimed is:

1. A microfiche construction for a reader or for a recorder including, a projection lens plate carrying a plurality of lenses over its surface, a base carrying a photographic emulsion and positioned parallel and contiguous to and relatively indexable with respect to the said lens plate, the improvement comprising, a Cassegrainian reflector for each of the lenses on the projection lens plate, a lower Cassegrainian reflector for each lens carried by said base, the corresponding upper Cassegrainian reflector for each lens defined by an annular, internally mirrored surface around the outermost periphery of each projection lens.

2. The microfiche construction of claim 1 wherein each lower Cassegrainian reflector is positioned in a sunken recess of the upper surface of said emulsion carrying base.

* * * * *